UNITED STATES PATENT OFFICE.

CHARLES ALDEN, OF NEWBURG, NEW YORK.

IMPROVEMENT IN PREPARING CLAMS AND OYSTERS FOR FOOD.

Specification forming part of Letters Patent No. 168,703, dated October 11, 1875; application filed April 23, 1875.

*To all whom it may concern:*

Be it known that I, CHARLES ALDEN, of Newburg, in the county of Orange and State of New York, have invented a certain new and useful Improved Process of Preparing Clams and Oysters for Food, of which the following is a specification:

This invention relates to an improved process for preparing oysters, clams, and other similar shell-fish for preservation; and it consists in combining the body or meat of the natural oyster, clam, or other shell-fish, after the same has been desiccated and pulverized, with the natural liquor of the same, after having been concentrated by evaporation, in combination with vegetable or any other alimentary matter, the whole being pulverized or granulated for the purposes of use, as hereinafter more fully set forth.

To enable others skilled in the art to make and use my invention, I will proceed to describe more particularly the process of preparing the oysters, clams, or other fish.

The oysters, clams, or other shell-fish, in any required quantity, are taken from the shell, and the natural liquor thereof separated from the meat or body by straining through a sieve, or by any other convenient means. The body or meat is then desiccated by evaporation, preferably by the Alden process of pneumatic evaporation, to a dry, crisp condition, so that the same can be pulverized or granulated by pounding, crushing, or grinding. The liquor, after separating the body or meat of the fish, is strained to separate impurities, and sufficient bread-crumbs, or other farinaceous or alimentary material, to absorb the whole of it, added to the same, after which the mass is desiccated by evaporation in the same manner as the meat or body of the oysters and clams, and, when dry, is pulverized and granulated and added to the desiccated meat. Salt and any other desired seasoning substances may be added to the compound, and the whole, after being thoroughly mixed, is put up in suitable packages for use.

By this process all the natural elements of the oyster or clam are preserved in suitable condition for use for making soups, chowder, fritters, and for other culinary purposes.

Having thus described my invention, what I claim, and desire to secure by Letters Patent, is—

The process of preparing oysters and clams for preservation by separating the meat from the liquor, desiccating and pulverizing the meat and mixing the liquor with alimentary substances, desiccating and pulverizing the mass, and combining it with the desiccated meat, substantially as described.

CHARLES ALDEN.

Witnesses:
W. HAUFF,
E. F. KASTENHUBER.